US012266240B2

(12) United States Patent
Andersson et al.

(10) Patent No.: US 12,266,240 B2
(45) **Date of Patent: *Apr. 1, 2025**

(54) GAMING MACHINE AND METHOD WITH SYMBOL ARRAY ALTERATION

(71) Applicant: LNW Gaming, Inc., Las Vegas, NV (US)

(72) Inventors: Mats Andersson, Gzira (MT); Oliver Andrews, Bristol (GB); Adam Fox, Bristol (GB); Lucas Parkinson, Montreal (CA)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,088

(22) Filed: Sep. 6, 2023

(65) Prior Publication Data

US 2023/0410609 A1 Dec. 21, 2023

Related U.S. Application Data

(63) Continuation of application No. 17/487,918, filed on Sep. 28, 2021, now Pat. No. 11,798,370.

(60) Provisional application No. 63/105,508, filed on Oct. 26, 2020.

(51) Int. Cl.
*G07F 17/32* (2006.01)

(52) U.S. Cl.
CPC ...... *G07F 17/3267* (2013.01); *G07F 17/3211* (2013.01)

(58) Field of Classification Search
CPC ......................... G07F 17/3267; G07F 17/3211
See application file for complete search history.

(56) References Cited

U.S. PATENT DOCUMENTS 4,101,129 A 7/1978 Cox
4,198,052 A 4/1980 Gauselmann
5,580,053 A 12/1996 Crouch
5,611,535 A 3/1997 Tiberio
5,807,172 A 9/1998 Piechowiak
(Continued)

FOREIGN PATENT DOCUMENTS

EP 70613 A2 1/1983
GB 1596363 A 8/1981
(Continued)

*Primary Examiner* — Dmitry Suhol
*Assistant Examiner* — Jason Pinheiro

(57) ABSTRACT

A gaming system and method utilize an electronic display device configured to display a plurality of symbol-bearing reels and an array of symbol positions. The array of symbol positions comprises a plurality of rows and columns. The plurality of symbol-bearing reels are spun and stopped to land symbols on the reels in the symbol positions of the array. Payouts are awarded for any winning symbol combinations along horizontal and vertical ways. In response to a triggering event, the array is expanded by expanding one or more of the rows of the array to add one or more symbol positions to each expanded row. The plurality of symbol-bearing reels are again spun and stopped to land symbols on the reels in the symbol positions of the expanded array. Payouts are again awarded for any winning symbol combinations along the horizontal and vertical ways.

12 Claims, 5 Drawing Sheets

(56) References Cited

U.S. PATENT DOCUMENTS 5,984,782 A 11/1999 Inoue
6,241,607 B1 6/2001 Payne et al.
6,261,178 B1 7/2001 Bennett
6,398,220 B1 6/2002 Inoue
6,413,162 B1 7/2002 Baerlocher et al.
6,464,436 B1 10/2002 Davis
6,520,856 B1 * 2/2003 Walker .................. G07F 17/323 463/21
6,544,120 B2 4/2003 Ainsworth
6,604,999 B2 8/2003 Ainsworth
6,676,511 B2 1/2004 Payne et al.
6,726,204 B2 4/2004 Inoue
6,830,211 B2 12/2004 Sloan
6,855,056 B2 2/2005 Inoue
6,880,826 B2 4/2005 Inoue
6,896,617 B2 5/2005 Daly
6,905,408 B2 6/2005 Inoue
6,923,441 B2 8/2005 Inoue
6,942,572 B2 9/2005 Inoue
6,966,835 B2 11/2005 Graham
6,988,731 B2 1/2006 Inoue
7,001,274 B2 2/2006 Baerlocher et al.
7,043,860 B2 5/2006 Inoue
7,108,602 B2 9/2006 Daly
7,214,132 B2 5/2007 Inoue
7,309,281 B2 12/2007 Baerlocher et al.
7,309,282 B2 12/2007 Baerlocher et al.
7,347,777 B2 3/2008 Gauselmann
7,351,144 B2 4/2008 Daly
7,361,089 B2 4/2008 Daly et al.
7,371,172 B2 5/2008 Inoue
7,387,570 B2 6/2008 Randall
7,393,277 B2 7/2008 Jackson
7,431,645 B2 10/2008 Han et al.
7,494,413 B2 2/2009 Singer et al.
7,585,221 B2 9/2009 Singer et al.
7,611,406 B2 11/2009 Fuller
7,637,450 B2 12/2009 Ordonez et al.
7,654,895 B2 2/2010 Pacey
7,701,499 B2 4/2010 Barnea et al.
7,839,548 B2 11/2010 Schwerdtner
7,927,204 B2 4/2011 Debrabander, Jr. et al.
7,950,994 B2 5/2011 Berman et al.
8,092,296 B2 1/2012 Inoue
8,137,179 B2 3/2012 Jensen et al.
8,277,307 B2 10/2012 Jensen et al.
8,444,477 B2 5/2013 Inoue
8,602,868 B2 12/2013 Johnson et al.
8,616,953 B2 12/2013 Yi
8,795,059 B2 * 8/2014 Aoki ................... G07F 17/3213 463/20
8,827,796 B2 9/2014 Vermaak et al.
8,939,832 B2 1/2015 Ryan
9,208,654 B2 12/2015 Kondo et al.
9,235,965 B2 1/2016 Tuck
9,342,962 B2 5/2016 Lee
9,345,961 B2 5/2016 Ryan
9,483,900 B2 11/2016 Aoki et al.
9,542,810 B2 1/2017 Gilmore et al.
9,652,933 B2 5/2017 Johnson et al.
9,704,332 B2 7/2017 Guerrero
9,750,172 B2 9/2017 Moore et al.
9,870,672 B2 1/2018 Guerrero
9,993,721 B2 6/2018 Palermo et al.
10,102,710 B2 * 10/2018 Boese ................. G07F 17/3244
10,157,516 B2 12/2018 Hendricks et al.
10,186,107 B2 * 1/2019 Kitamura ............ G07F 17/3267
10,255,751 B2 4/2019 Boese et al.
10,332,334 B2 * 6/2019 Bolling, Jr. ......... G07F 17/3209
10,410,477 B2 9/2019 Hoffman et al.
10,529,172 B2 1/2020 Hendricks et al.
10,546,466 B2 1/2020 Lee
10,636,256 B2 4/2020 Nelson et al.
10,706,664 B2 7/2020 Boese et al.
10,922,916 B2 * 2/2021 Fong ................... G07F 17/3244
11,257,327 B1 * 2/2022 Sanborn .............. G07F 17/3267
2003/0234316 A1 12/2003 Sloan
2004/0242313 A1 12/2004 Munoz
2005/0159208 A1 * 7/2005 Pacey ................ G07F 17/3211 463/20
2006/0108767 A1 5/2006 Susko
2008/0064477 A1 * 3/2008 Fong ..................... G07F 17/326 463/20
2008/0108411 A1 * 5/2008 Jensen ................ G07F 17/3286 463/20
2008/0220839 A1 9/2008 Debrabander et al.
2008/0302900 A1 12/2008 Ordonez et al.
2009/0061984 A1 3/2009 Yi
2009/0325678 A1 12/2009 Gomez
2010/0016061 A1 1/2010 Gomez et al.
2012/0157181 A1 6/2012 Jensen et al.
2013/0065663 A1 3/2013 Johnson et al.
2013/0102375 A1 4/2013 Aoki et al.
2013/0184045 A1 7/2013 Vermaak et al.
2013/0310143 A1 11/2013 Kondo et al.
2013/0344933 A1 12/2013 Ryan
2014/0094263 A1 4/2014 Johnson et al.
2014/0179399 A1 6/2014 Lee
2014/0179400 A1 6/2014 Lee
2014/0309015 A1 10/2014 Aoki et al.
2014/0323198 A1 10/2014 Tuck
2015/0087392 A1 3/2015 Guerrero
2015/0289435 A1 10/2015 Moore et al.
2015/0379831 A1 * 12/2015 Lee ....................... G07F 17/326 463/20
2016/0049040 A1 2/2016 Palermo et al.
2016/0078714 A1 3/2016 Gilmore et al.
2016/0093152 A1 3/2016 Hendricks et al.
2016/0104345 A1 4/2016 Macgregor et al.
2016/0125688 A1 5/2016 Hoffman et al.
2016/0133094 A1 * 5/2016 Thomas .............. G07F 17/3246 463/20
2017/0024957 A1 * 1/2017 Boese ................. G07F 17/3213
2017/0065663 A1 * 3/2017 Wilhelm ................ A61K 45/06
2017/0092045 A1 3/2017 Kitamura et al.
2017/0193756 A1 * 7/2017 Schmidt .................. G07F 17/34
2017/0270743 A1 9/2017 Guerrero
2018/0012444 A1 1/2018 Ballone et al.
2018/0025585 A1 * 1/2018 Schmidt .............. G07F 17/3211 463/20
2018/0061174 A1 3/2018 Boese et al.
2019/0005780 A1 1/2019 Nelson et al.
2019/0088078 A1 3/2019 Hendricks et al.
2019/0122485 A1 4/2019 Singer et al.
2019/0206184 A1 7/2019 Boese et al.
2020/0074813 A1 3/2020 Cuddy et al.
2020/0118382 A1 4/2020 Hendricks et al.

FOREIGN PATENT DOCUMENTS

GB 2157047 A 10/1985
GB 2182476 A 5/1987
GB 2192478 B 12/1989
GB 2253300 A 9/1992
GB 2419998 B 5/2009
WO 0218025 A1 3/2002

* cited by examiner

GAMING MACHINE AND METHOD WITH SYMBOL ARRAY ALTERATION

CROSS-REFERENCE TO RELATED APPLICATIONS

This application is a continuation of U.S. patent application Ser. No. 17/487,918, filed Sep. 28, 2021, which claims the benefit of priority to U.S. Provisional Patent Application No. 63/105,508, filed Oct. 26, 2020, the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021-2023, LNW Gaming, Inc.

FIELD OF THE INVENTION

The present invention relates to a technological improvement to gaming systems, gaming machines, and methods and, more particularly, to new and improved animations in connection with a symbol array feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize an electronic display device configured to display a plurality of symbol-bearing reels and an array of symbol positions. The array of symbol positions comprises a plurality of rows and columns. The plurality of symbol-bearing reels are spun and stopped to land symbols on the reels in the symbol positions of the array. Payouts are awarded for any winning symbol combinations along horizontal and vertical ways. In response to a triggering event, the array is expanded by expanding one or more of the rows of the array to add one or more symbol positions to each expanded row. The plurality of symbol-bearing reels are again spun and stopped to land symbols on the reels in the symbol positions of the expanded array. Payouts are again awarded for any winning symbol combinations along the horizontal and vertical ways. The reels may be associated with the respective rows of the array such that each stopped reel serves to populate the symbol positions of a respective one of the rows.

Each horizontal way comprises symbol positions in respective consecutive ones of the columns starting with the leftmost symbol position of each row. Each vertical way comprises symbol positions in respective consecutive ones of the rows starting from the topmost row. Said another way, the symbols of any winning symbol combinations along the horizontal ways appear in respective consecutive ones of the columns starting with the leftmost symbol position of each row, and the symbols of any winning symbol combinations along the vertical ways appear in respective consecutive ones of the rows starting from the topmost row. In one embodiment, only the highest win is awarded per way.

Additional aspects of the invention will be apparent to those of ordinary skill in the art in view of the detailed description of various embodiments, which is made with reference to the drawings, a brief description of which is provided below.

Figure 1:
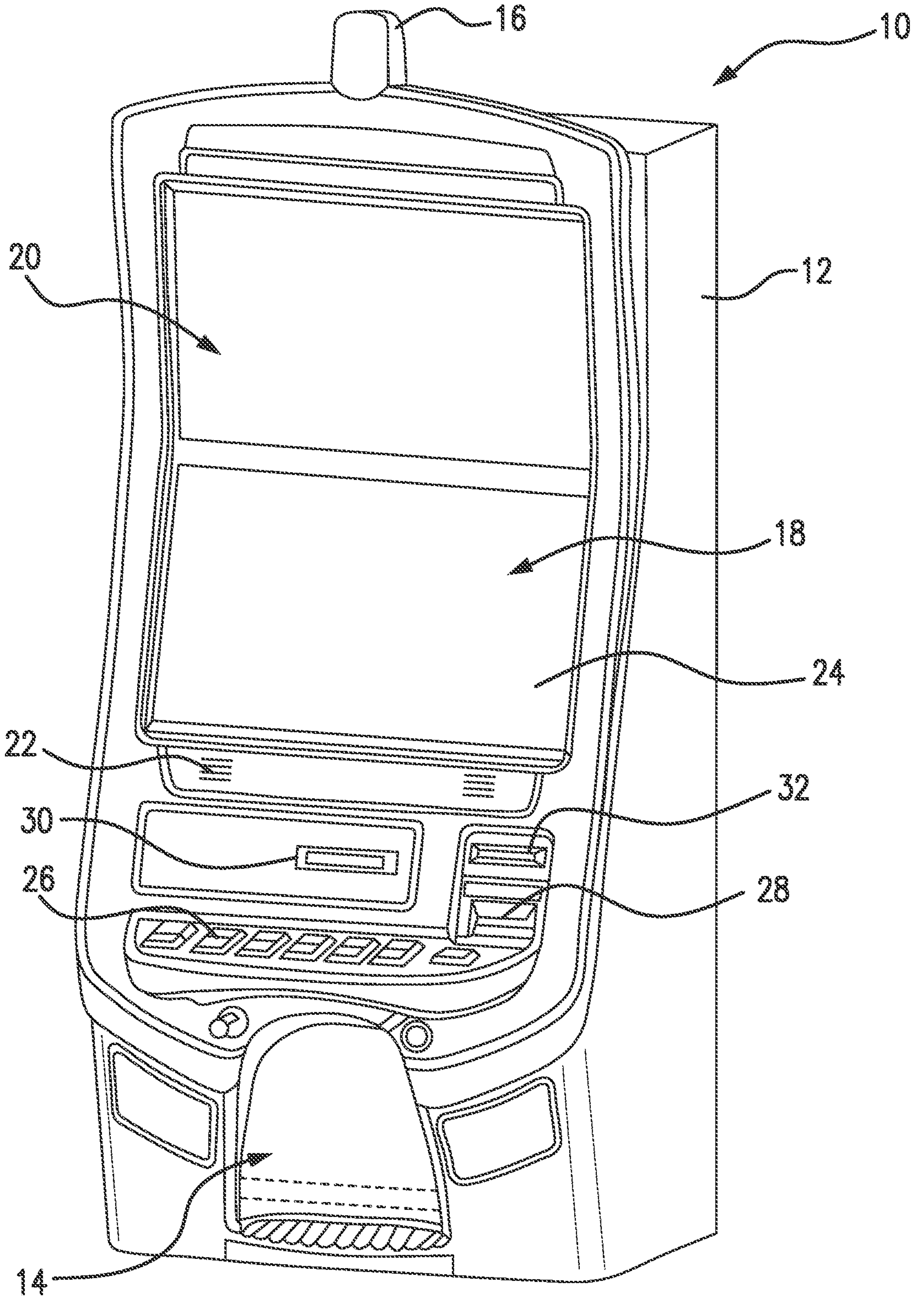
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
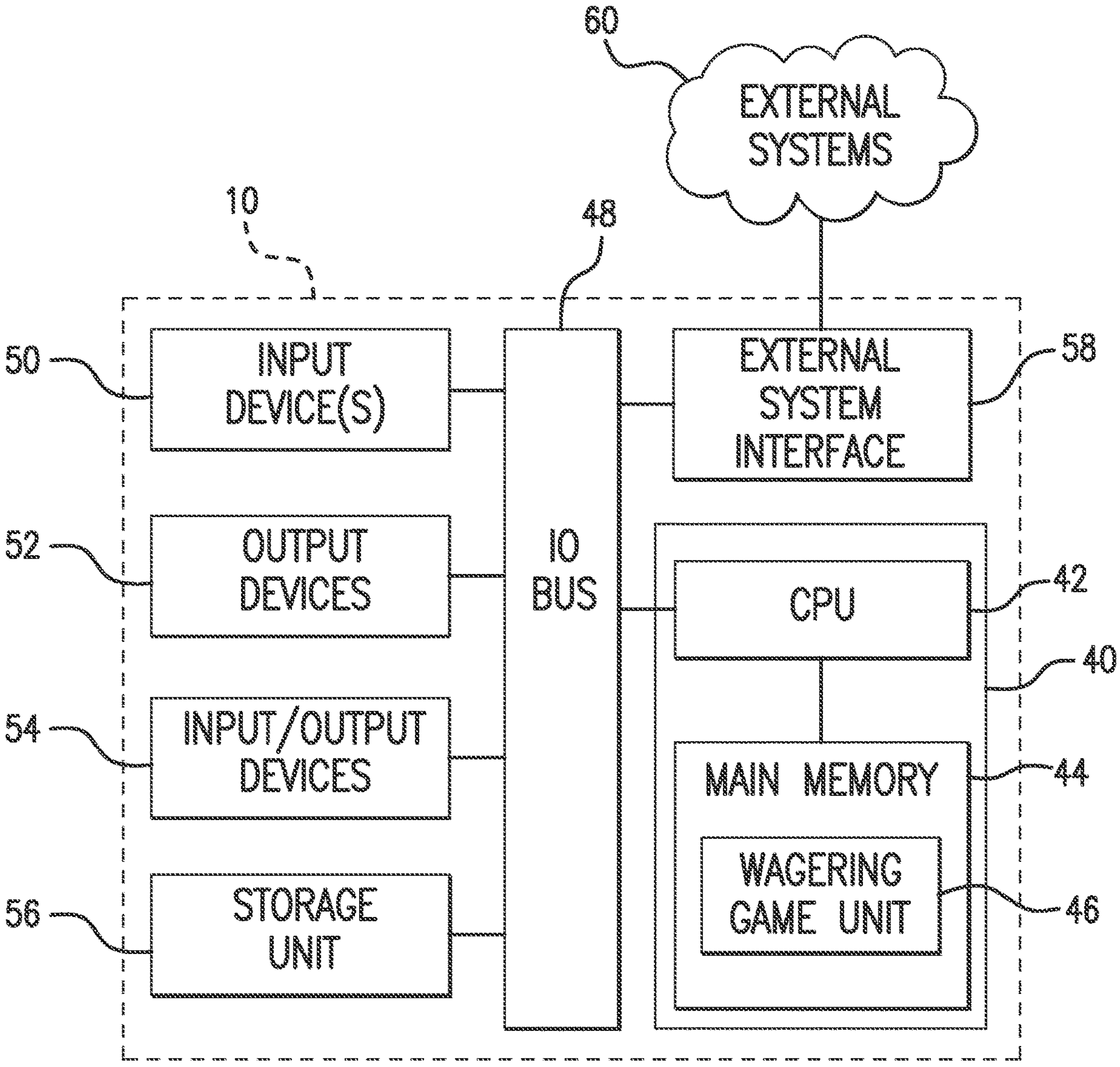
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 3:
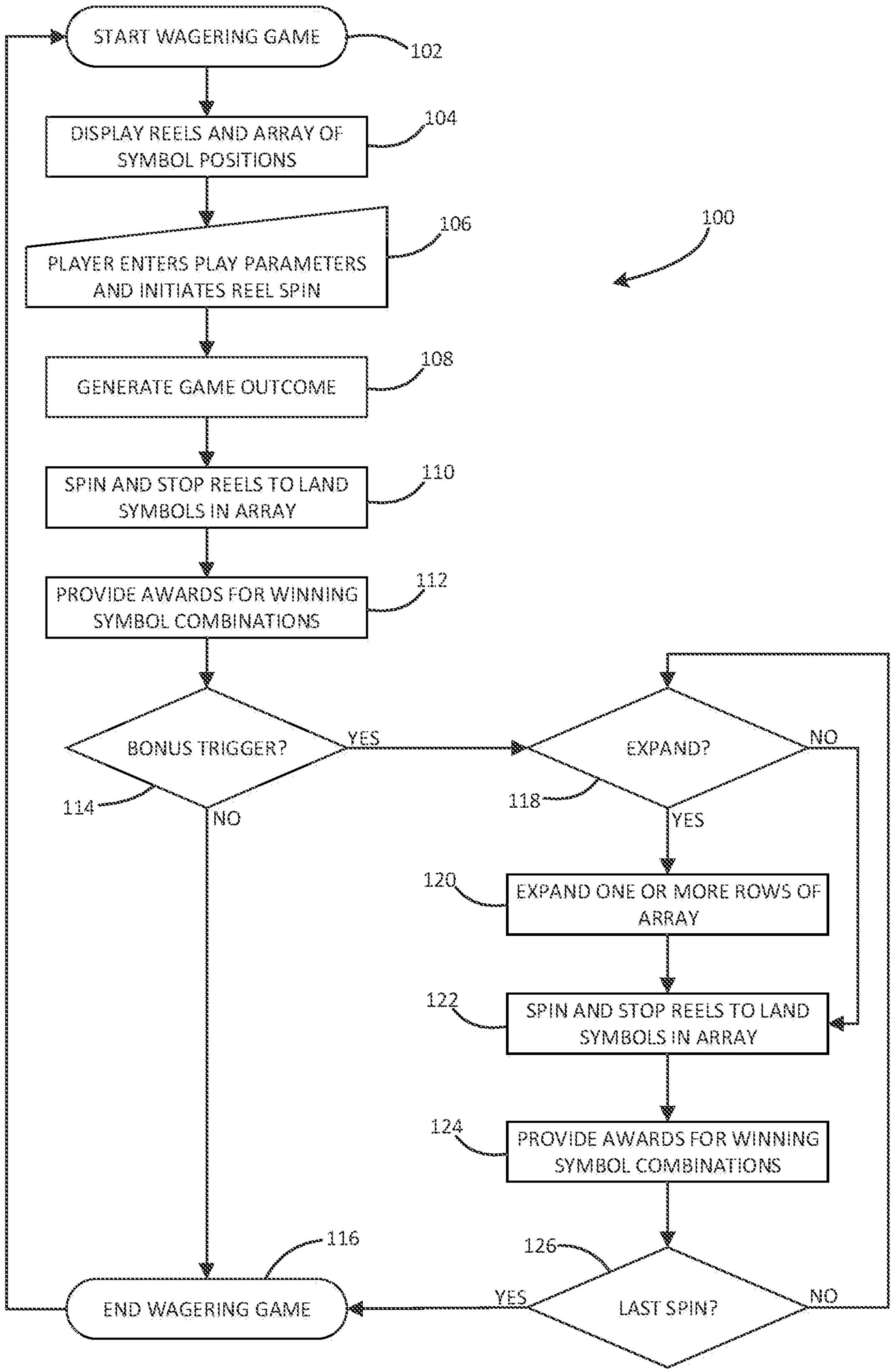
FIG. 3 is a flowchart for an algorithm that corresponds to instructions executed by a controller, according to an embodiment of the present invention.

Referring now to FIG. 3, there is shown a flowchart representing one data processing method 100 corresponding to at least some instructions stored and executed by the game-logic circuitry 40 in FIG. 2 to perform operations embodying the present invention. The operations are described below in conjunction with FIGS. 4 through 7, which depict diagrams associated with a game cycle, including a triggered series of free games, illustrating aspects of the present invention. In FIGS. 4 through 7, the heavy bordered region of the array is active and currently in play, and the region outside the bordered region is the space for potential expansions of the array during the free games. Within the bordered region, white numbered cells represent symbol positions bearing symbols that do not pay out or trigger the free games, while patterned numbered cells represent symbol positions bearing symbols that pay out or trigger the free games. Different patterns (e.g., diagonal stripes, horizontal stripes, and vertical stripes) represent different symbols. The array index numbers 0 through 47 are not visible to the player but facilitate the explanations below.

Figure 4:
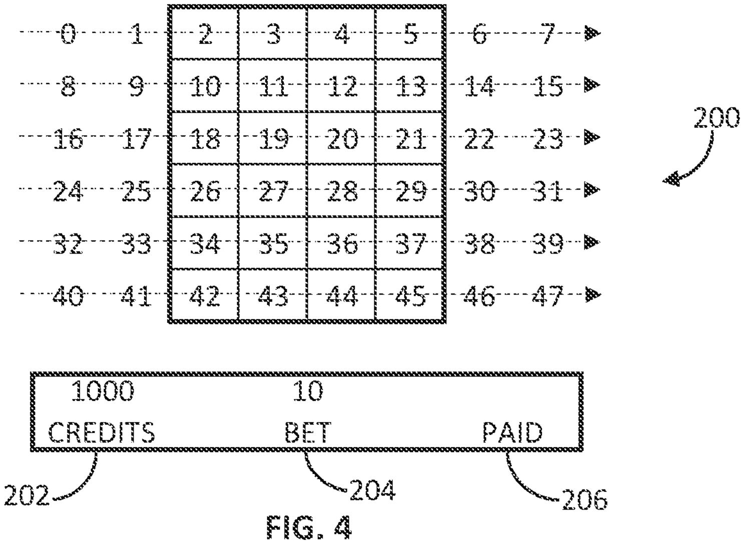
FIGS. 4 through 7 are diagrams of a game cycle, including a triggered series of free games, illustrating aspects of the present invention.

At step 102, the game-logic circuitry initiates a wagering game. At step 104, the game-logic circuitry directs a display of the gaming machine to display a plurality of symbol-bearing reels and an array of symbol positions. The array of symbol positions comprises a plurality of rows and columns. The rows of the array are oriented in a horizontal direction, and the columns of the array are oriented in a generally vertical direction. Alternatively, the "rows" of the array may be oriented in a vertical direction, and the "columns" of the array may be oriented in a horizontal direction. The symbol positions in each row of the array are horizontally aligned with each other, and the symbol positions in each column of the array are vertically aligned with each other. The reels are associated with the respective rows of the array such that the reels spin horizontally in a direction illustrated by the arrows in FIG. 4. The reel spin is animated by depicting symbol-bearing strips moving horizontally across the display and synchronously updating the symbols visible on each strip as the strip moves across the display. As shown in FIG. 4, the active array 200 may initially include six rows and four columns. The four symbol positions in each row are populated by a respective horizontal reel. The symbol positions of the array currently in play are designated by index numbers 2-5, 10-13, 18-21, 26-29, 34-37, and 42-45. Although not shown in FIG. 4, the symbols borne by the reels may include standard royals such as 7, 8, 9, 10, J, Q, K, and A, a wild symbol, and a bonus triggering symbol such as FREE. Alternatively or in addition, the symbols may include themed symbols associated with a brand of the wagering game.

At step 106, a player enters play parameters such as a wager amount to be drawn from a credit balance and number of ways or lines along which winning symbol combinations must appear. To initiate a spin of the reels, the player may press a "Spin Reels" or "Max Bet" key on a button panel or touch screen. As shown in FIG. 4, the credit balance may be shown on a credit meter 202, the wager amount may be shown on a bet meter 204, and any win amount may be shown on a paid meter 206.

At step 108, in response to the player initiating the reel spin, the game-logic circuitry generates a random game outcome using the above-referenced RNG. At step 110, the game-logic circuitry spins the reels (in the direction illustrated by the arrows in FIG. 4) and stops the reels to land a plurality of symbols in respective symbol positions of the displayed array according to the selected game outcome.

At step 112, the game-logic circuitry provides awards for any winning symbol combinations in the active array. In one embodiment, payouts are awarded for any winning combinations along horizontal and vertical ways or lines. Each horizontal way comprises symbol positions in respective consecutive ones of the columns starting with the leftmost symbol position of each row. Each vertical way comprises symbol positions in respective consecutive ones of the rows starting from the topmost row. Said another way, the symbols of any winning symbol combinations along the horizontal ways appear in respective consecutive ones of the columns starting with the leftmost symbol position of each row, and the symbols of any winning symbol combinations along the vertical ways appear in respective consecutive ones of the rows starting from the topmost row. Only the highest win is awarded per horizontal way, and only the highest win is awarded per vertical way.

In the 6×4 active array shown in FIG. 4, the number of ways is equal to 1296 horizontal ways extending from left-to-right and 4096 vertical ways extending from top-to-bottom, for a total number of 5392 ways along which winning symbol combinations may appear. The horizontal ways include, but are not limited to, the six horizontal rows themselves, and the vertical ways include, but are not limited to, the four vertical columns themselves. To communicate the awards and winning symbol combinations to the player, the game-logic circuitry directs the display to animate the symbols in each winning combination, the way or line along which each winning combination appears, and the award amount. The animation may, for example, include applying a border, pattern, color change, background change, watermark, or other distinguishing characteristic to the winning symbols and/or winning symbol positions.

At step 114, the game-logic circuitry determines whether or not the landed plurality of symbols include a bonus triggering combination. The bonus triggering combination may, for example, be a "scatter" combination comprising a threshold number of a particular symbol landing anywhere in the active array. In one embodiment, at least four scattered FREE symbols trigger a series of three free games. In other embodiments, the triggered number of free games may be more or less than three. If the reel spin does not result in the bonus trigger at step 114, the game-logic circuitry concludes the current game cycle at step 116. If, however, the reel spin results in the bonus trigger at step 114, flow proceeds to step 118 to conduct a series of free games with steps 118, 120, 122, 124, and 126. As shown in FIG. 4, the reel spin resulted in four scattered FREE symbols (represented by symbol positions 5, 11, 26, and 36 bearing a common diagonal-striped pattern) thereby triggering a series of three free games represented in FIGS. 5 through 7. The three free games may commence with the same 6×4 active array with each row populated by a respective horizontal reel.

At step 118, prior to each free game in the series, the game-logic circuitry randomly determines whether or not to expand the active array by expanding one or more of the rows of the array to add one or more symbol positions to each expanded row. This random determination may, for example, be a mystery event independent of any symbols landing in the array. If the game-logic circuitry determines not to expand the active array at step 118, the game-logic circuitry spins and stops the reels to populate the active array at step 122 and provides awards for any winning symbol combinations in the active array 124 as described above with respect to the wagered-on base game.

Figure 6:
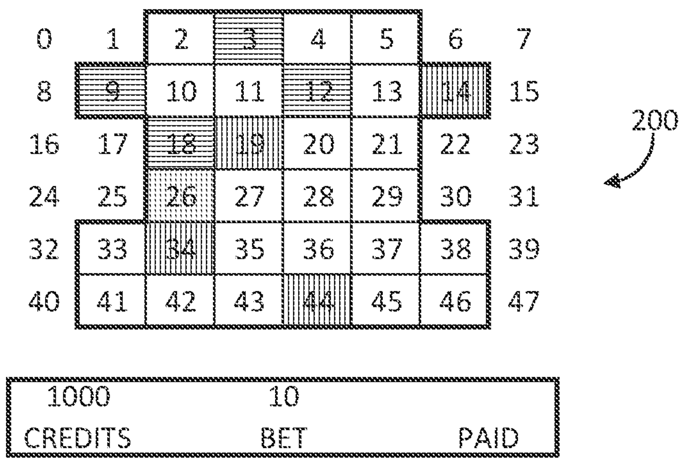

If, however, the game-logic circuitry determines to expand the active array at step 118, the game-logic circuitry directs the display to show new and improved animations expanding one or more rows of the active array at step 120. In one embodiment, multiple rows may expand at the same time and different rows may expand by varying numbers of symbol positions. Also, an expanding row always expands by the same number of symbol positions in opposite directions (i.e., the left and right directions) such that the expanding row may expand by one symbol position in each direction (for a total expansion of two symbol positions), two symbol positions in each direction (for a total expansion of four symbol positions), or so on. When a row is expanded, the reel associated with that row still populates all the symbol positions in that row: in effect, the number of adjacent symbols on the reel that are visible to the player is increased to correspond to the number of symbol positions in the expanded row. As shown in FIG. 6, the expanded array is preferably symmetrical about a vertical center line, i.e., the expanded array is center aligned (as opposed to being aligned with a left or right margin). After the game-logic circuitry expands one or more rows of the active array at step 120, the game-logic circuitry spins and stops the reels to populate the expanded array at step 122 and provides awards for any winning symbol combinations in the expanded array at step 124. To communicate the awards and winning symbol combinations to the player, the game-logic circuitry directs the display to animate the symbols in each winning combination, the line or way along which each winning combination appears, and the award amount.

At step 126, the game-logic circuitry determines whether or not the completed free game was the last free game in the series of free games. If it was the last free game, the game-logic circuitry concludes the game cycle at step 116. If, however, it was not the last free game, flow proceeds back to steps 118, 120, 122, and 124 to conduct another free game, including whether or not to further expand the active array at steps 118 and 120. If the array was expanded in a prior free game, the array remains expanded for any remaining subsequent free games and may be further expanded prior to each such free game. In each further expansion, multiple rows may expand at the same time, different rows may expand by varying numbers of symbol positions, and an expanding row expands by the same number of symbol positions in opposite directions (i.e., left and right directions).

In one embodiment, the series of free games can be retriggered by the appearance of at least four scattered FREE symbols in any free game. If retriggered, three free games are added to the current remaining number of free games.

FIGS. 4 through 7 are illustrative diagrams of reel spin outcomes in a wagered-on base game (FIG. 4) and a series of three free games (FIGS. 5-7) that may be triggered by the wagered-on base game. For purposes of this example, a winning combination requires at least three-of-a-kind along a horizontal or vertical way as described herein.

Figure 5:
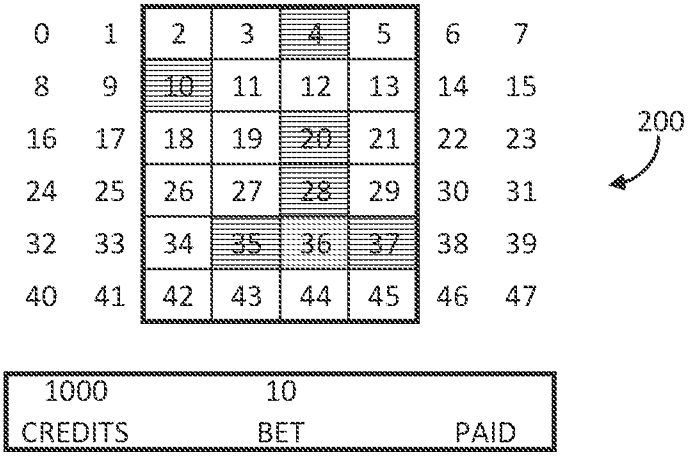
Figure 7:
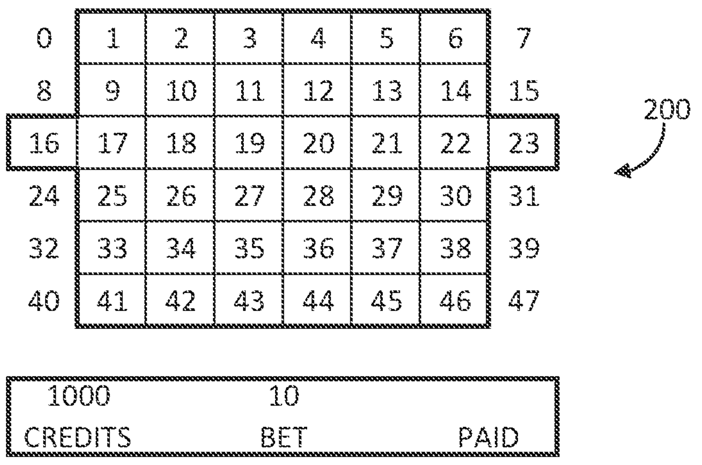

Referring to FIG. 4, the wagered-on base game results in an outcome containing four scattered FREE symbols (represented by symbol positions 5, 11, 26, and 36 bearing a common diagonal-striped pattern) that trigger the series of three free games in FIGS. 5-7. Other than this bonus trigger, the outcome contains no winning symbol combinations.

Referring to FIG. 5, the first free game does not expand the array and results in an outcome including a first winning symbol (represented by a horizontal-striped pattern in symbol positions 4, 10, 20, 28, 35, 36, and 37) that pays out five-of-a-kind along three vertical ways and four-of-a-kind along four horizontal ways. The three winning vertical ways include symbol position combinations 4-10-20-28-35, 4-10-20-28-36, and 4-10-20-28-37. The four winning horizontal ways include symbol position combinations 10-35-4-37, 10-35-20-37, 10-35-28-37, and 10-35-36-37.

Referring to FIG. 6, the second free game expands the second, fifth, and sixth rows of the array by two symbol positions apiece and results in an outcome including a first winning symbol (represented by a horizontal-striped pattern in symbol positions 3, 9, 12, and 18) and a second winning symbol (represented by a vertical-striped pattern in symbol positions 14, 19, 26, 34, and 44). The first winning symbol pays out three-of-a-kind along two vertical ways and four-of-a-kind along one horizontal way. The two winning vertical ways include combinations 3-9-18 and 3-12-18. The winning horizontal way includes combination 9-18-3-12. The first winning symbol also forms a three-of-a-kind along the horizontal way including combination 18-3-12. Because this win uses the same horizontal way as the four-of-a-kind along combination 9-18-3-12, only the highest win is paid out, i.e., the four-of-a-kind. The second winning symbol pays out three-of-a-kind along one horizontal way including combination 26-19-44 because position 26 is the leftmost position in its row. Although symbol position 34 contains the second winning symbol, position 34 cannot contribute to a payout because (i) position 34 is not the leftmost symbol position in its row and (ii) there are no second winning symbols in the leftmost column containing positions 9, 33, and 41.

Referring to FIG. 7, the third free game expands the first and fourth rows of the array by two symbol positions apiece and the third row by four symbol positions. The third free game results in an outcome that does not contain any winning symbol combinations along a horizontal or vertical way.

In one embodiment, the game-logic circuitry applies constraints to row expansion. Specifically, any given row of the array can only expand if such expansion would cause that row to be no more than two positions larger than the number of symbol positions in any other row. In other words, after any expansion, the number of symbol positions in each of the rows will be within two symbol positions of each other. For example, if the number of symbol positions in rows one through six are 4, 4, 4, 4, 4, and 4, respectively, then on the current spin: (i) if any one of the rows does not expand, then the other rows can expand by no more than two symbol positions (for a total of six symbol positions in an expanded row); and (ii) if all the rows expand by two symbol positions, then any of the rows can further expand by another two symbol positions (for a total of eight symbol positions in the further expanded row). If the number of symbol positions in rows one through six are 4, 6, 6, 4, 4, and 6, respectively, then on the current spin: (i) if any one of rows one, four, and five does not expand, then rows two, three, and six cannot expand; and (ii) if rows one, four, and five each expand by two symbol positions, then (a) each of those rows can further expand by another two symbol positions, and/or (b) rows two, three, and six can each expand by two symbol positions. In the absence of the expansion constraint described above, a player could get frustrated by situations where the number of horizontal ways remains the same but the likelihood of achieving a win is reduced.

In another embodiment, a row may expand by one or more symbol positions in the left direction only, the right direction only, or both directions. If the rows are then shifted to keep the array symmetrical about a vertical center line, one or more rows may be horizontally offset from other rows by one-half symbol position. In yet another embodiment, after any expansion, the rows of the expanded array may be shifted so that the array is either left aligned (i.e., the leftmost symbol positions of the rows are aligned with each other) or right aligned (i.e., the rightmost symbol positions of the rows are aligned with each other). In a further embodiment, each symbol position of the active array is populated by a respective independent reel. Thus, in a 6×4 array for example, the 24 symbol positions are populated by 24 independent reels, respectively.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

displaying, on an electronic display device, a plurality of symbol-bearing reels comprising an array of symbol positions, the array of symbol positions comprising a plurality of rows and columns, each symbol position populated by a respective independent reel;

conducting a first spin of the symbol bearing reels to land symbols on the reels in the symbol positions of the array according to one or more first outputs of a continuously cycling random number generator;

in response to a triggering event, displaying, on the electronic display device, an animation of expansion of the array comprising expanding one or more of the rows of the array to add one or more symbol positions to each expanded row, wherein the expanded array is center aligned, and wherein the expanding includes expanding each of the one or more rows by a same number of symbol positions in opposite directions, and wherein any given row of the array can only expand if such expansion would cause that row to be no more than a predetermined number of positions larger than the number of symbol positions in any other row; and conducting an additional spin of the symbol bearing reels to land symbols on the reels in the symbol positions of the expanded array according to one or more second outputs of the continuously cycling random number generator.

2. The method of claim 1, wherein the symbol positions in each row of the array are horizontally aligned with each other, and the symbol positions in each column of the array are vertically aligned with each other.

3. The method of claim 1, wherein the triggering event is a mystery event independent of any symbols landing in the array.

4. The method of claim 1, wherein in response to each occurrence of the triggering event, the operations of displaying the animation of expansion of the array and conducting the additional spin after the additional spin, are repeated.

5. The method of claim 1, wherein the rows of the array are oriented in a horizontal direction, and wherein the columns of the array are oriented in a vertical direction.

6. A method of operating a gaming machine, the method comprising the operations of:

displaying, on an electronic display device, a plurality of symbol-bearing reels comprising an array of symbol positions, the array of symbol positions comprising a plurality of rows and columns, each symbol position populated by a respective independent reel;

conducting a first spin of the symbol bearing reels to land symbols on the reels in the symbol positions of the respective rows of the array according to one or more first outputs of a continuously cycling random number generator, in response to a first triggering event, conducting, by the game-logic circuitry, a series of free games wherein:

in response to a second triggering event, displaying, on the electronic display device, an animation of expansion of the array comprising expanding one or more of the rows of the array to add one or more symbol positions to each expanded row, wherein the expanded array is center aligned, and wherein the expanding includes expanding each of the one or more rows by a same number of symbol positions in opposite directions, and wherein any given row of the array can only expand if such expansion would cause that row to be no more than a predetermined number of positions larger than the number of symbol positions in any other row;

conducting an additional spin of the symbol bearing reels to land symbols on the reels in the symbol positions of the respective rows of the expanded array array according to one or more second outputs of the continuously cycling random number generator.

7. The method of claim 6, wherein the symbol positions in each row of the array are horizontally aligned with each other, and the symbol positions in each column of the array are vertically aligned with each other.

8. The method of claim 6, wherein the triggering event is a mystery event independent of any symbols landing in the array.

9. The method of claim 6, wherein in response to each occurrence of the second triggering event, the operations of displaying the animation of expansion of the array and conducting the additional spin are repeated.

10. The method of claim 6, wherein the rows of the array are oriented in a horizontal direction, and wherein the columns of the array are oriented in a generally vertical direction.

11. A gaming system comprising:

a gaming machine including an electronic display device configured to display plurality of symbol-bearing reels comprising an array of symbol positions, the array of symbol positions comprising a plurality of rows and columns, each symbol position populated by a respective independent reel; and game-logic circuitry configured to perform the operations of:

conducting a first spin of the symbol bearing reels to land symbols on the reels in the symbol positions of the array according to one or more first outputs of a continuously cycling random number generator;

in response to a triggering event, displaying, on the electronic display device, an animation of expansion of the array comprising expanding one or more of the rows of the array to add one or more symbol positions to each expanded row, wherein the expanded array is center aligned, and wherein the expanding includes expanding each of the one or more rows by a same number of symbol positions in opposite directions, and wherein any given row of the array can only expand if such expansion would cause that row to be no more than a predetermined number of positions larger than the number of symbol positions in any other row;

conducting a second spin of the symbol-bearing reels to land symbols on the reels in the symbol positions of the expanded array according to one or more second outputs of a continuously cycling random number generator.

12. The gaming system of claim 11, wherein the triggering event is a mystery event independent of any symbols landing in the array.

* * * * *